United States Patent [19]

Thomas et al.

[11] Patent Number: 4,737,475

[45] Date of Patent: Apr. 12, 1988

[54] ARSENIC-FREE LEAD SILICATE VACUUM TUBE GLASS

[75] Inventors: George L. Thomas, Chesterland; Anup Sircar, Shaker Heights, both of Ohio

[73] Assignee: General Electric Company, Schenectady, N.Y.

[21] Appl. No.: 44,674

[22] Filed: May 1, 1987

Related U.S. Application Data

[62] Division of Ser. No. 785,320, Oct. 7, 1985, Pat. No. 4,677,081.

[51] Int. Cl.$^4$ .................. C03C 3/102; C03C 3/095; C03C 3/07
[52] U.S. Cl. ........................ 501/60; 501/62; 501/64; 501/74; 252/478; 313/480
[58] Field of Search .............. 501/60, 61, 62, 64, 501/74; 313/480; 252/478

[56] References Cited

U.S. PATENT DOCUMENTS

| | | | |
|---|---|---|---|
| 2,762,713 | 9/1956 | Davis | 501/60 |
| 2,964,414 | 12/1960 | Dalton | 501/60 |
| 3,464,932 | 9/1969 | Connelly et al. | 252/478 |
| 3,854,964 | 12/1974 | Thomas et al. | 313/92 |
| 4,063,623 | 7/1977 | Deeg et al. | 501/64 |
| 4,520,115 | 5/1985 | Speit et al. | 501/64 |

FOREIGN PATENT DOCUMENTS 2057422 3/1981 United Kingdom ............... 501/64

OTHER PUBLICATIONS

Uhlmann, D. R.; et al., *Glass:Science and Technology*, vol. 1, Glass–Forming Systems, Academic Press, 1983, p. 152.
Volt, M. B.; *Glass Science and Technology*, 7, Chemical Approach to Glass, Elsevier Science Publishing Co., NY, NY, 1984, p. 392.
Doremus, R. H.; *Glass Science*, John Wiley and Sons, New York, 1973, pp. 237–239.

*Primary Examiner*—Mark L. Bell
*Attorney, Agent, or Firm*—Edward M. Corcoran; Philip L. Schlamp; J. F. McDevitt

[57] ABSTRACT

A glass composition specially useful in the glass envelope of TV receiver tubes and which is of the lead silicate type is disclosed comprising in weight percent 30–65% $SiO_2$, 20–40% PbO, 5–20% alkali metal oxides, 0–2% $Al_2O_3$, 0–10% alkaline earth metal oxides, 0.2–2% $Sb_2O_3$, and 0.1–0.5% $CeO_2$. The improvement resides in employment of a novel refining system when the glass is formed which employs $Sb_2O_3$, niter and $CeO_2$ as the refining agents in particular weight proportions to reduce the seed count in the molten glass while also reducing thermal shock breakage when the solid glass product is thereafter thermally reworked.

6 Claims, 1 Drawing Sheet

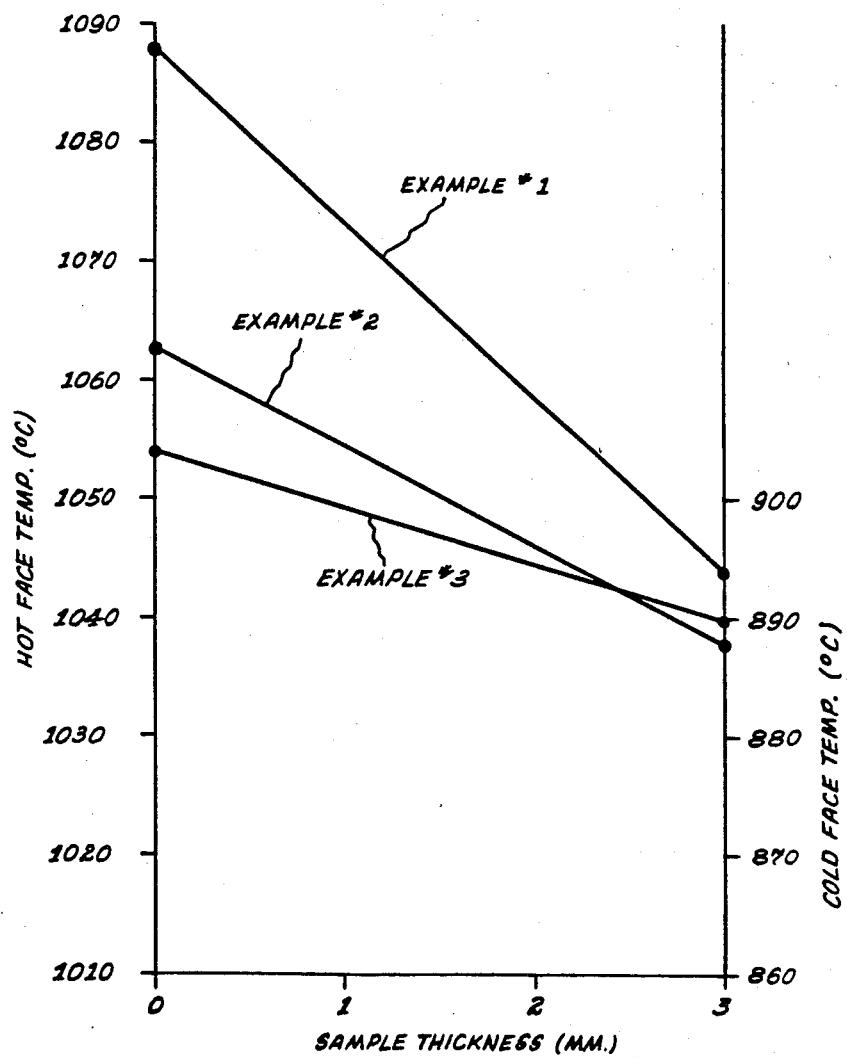

ARSENIC-FREE LEAD SILICATE VACUUM TUBE GLASS

This is a division of application Ser. No. 785,320, filed Oct. 7, 1985, now U.S. Pat. No. 4,677,081.

BACKGROUND OF THE INVENTION

Various lead silicate glasses which absorb x-rays have long been used to construct vacuum tubes for television receiver sets being operated in the 20-40 KV region. For example, there is disclosed in U.S. Pat. No. 3,854,964, assigned to assignee of the present invention, a glass composition used in this manner consisting of, by weight, 30-40% $SiO_2$, 3-7% $K_2O$, 0-2% $Na_2O$, 0.3% $Al_2O_3$, 35-50% PbO, 0-15% BaO, 0-15% $Sb_2O_3$ and 0-15% CaO. In still another now abandoned patent application, Ser. No. 100,407, also assigned to the present assignee, there is disclosed a different glass composition for the same purpose having as its essential constituents by weight, 40-48% $SiO_2$, 3.5-5.5% $Al_2O_3$, 0.8-2.8% $Na_2O$, 9-12% $K_2O$, 28-37% PbO, 0-3% CaO and 2-10% BaO. In said latter defined glass composition, it was found that adding BaO to this lead glass improved the x-ray absorption in the "hard" X-ray region of 30-40 KV. A still different glass composition now being commercially employed as the face plate component in this type vacuum tube is reported to have a composition in weight percent 59.6% $SiO_2$, 3-6% $Al_2O_3$, 13.6% combined BaO plus SrO content, 4.2% CaO, 1.7% MgO, 7.3 $Na_2O$, 8.0% $K_2O$, 0.6% F, 0.15% $CeO_2$, 0.2% $AS_2O_3$, 0.4% $B_2O_3$, and 0.1% PbO.

As can be noted in the development of the aforementioned prior art glasses for the present product application, the removal of arsenic as a refining agent has taken place for ecological considerations. The replacement of arsenic with antimony as the principal refining agent results in certain drawbacks, however, both during melting of the glass itself wherein a higher seed count in the refined glass is experienced as well as incurring higher thermal shock breakage when the solid glass product is thereafter thermally reworked generally with gas oxygen flames when assembling the vacuum tube parts together. Both of said drawbacks are believed attributable to lowering the refining and oxidizing action when antimony oxide replaces arsenic oxide as the refining agent. A further addition of niter to the antimony refining system has also not alleviated the aforementioned drawbacks which may account for the continued use of arsenic as an essential refining agent when melting lead silicate glasses.

SUMMARY OF THE INVENTION

It has now been found that an addition of cerium oxide to a niter and antimony refining system for said lead glasses provides an effective means to solve both of the aforesaid problems when the modified refining system adopts controlled proportions of the individual refining agents. Utilization of cerium oxide as a refining agent was not expected since its prior use in glass compositions has generally been limited to preventing glass solarization. There is now provided in accordance with the present invention, an arsenic-free lead silicate vacuum tube glass comprising in weight percent 30-65% $SiO_2$, 20-40% PbO, 5-20% alkali metal oxides, 0-2% $Al_2O_3$, 0-10% alkaline earth metal oxides, 0.2-2% $Sb_2O_3$, and 0.1-0.5% $CeO_2$, wherein the improvement comprises melting said glass composition with $Sb_2O_3$, niter and $CeO_2$ as refining agents with the aggregate content of $Sb_2O_3$ and $CeO_2$ being in the range of 0.4-2 weight percent while the weight ratio of niter to the aggregate weight of $Sb_2O_3$ and $CeO_2$ is in the range 0.5-4.0 which reduces the seed count in the molten glass while also reducing thermal shock breakage when the solid glass product is thereafter thermally reworked. As used in the present specification, the term "niter" means either sodium nitrate or potassium nitrate, including all combinations of said individual compounds.

A minimum level of 0.1% by weight cerium oxide is required in the present vacuum tube glass to achieve the foregoing benefits whereas a maximum 0.5 weight cerium oxide content is maintained to avoid an optical transmission loss in the visible spectrum as compared with a glass devoid of cerium oxide. The lead oxide content in said glasses is maintained at a relatively high level with the above specified maximum concentration not being exceeded so as not to deleteriously effect the viscosity characteristics of the glass. The silica content in said glass also preserves a proper viscosity-temperature characteristic enabling both initial tube drawing and subsequent thermal reworking in assembling the vacuum tube parts together. From all said considerations, a preferred glass composition of the present invention consists essentially of in weight percent 45-50% $SiO_2$, 25-35% PbO, 10-15% alkali metal oxides, 0.5-5% $Al_2O_3$, 5-10% alkaline earth metal oxides, 0.2-2% $Sb_2O_3$, and 0.2-4% $CeO_2$.

BRIEF DESCRIPTION OF THE DRAWING

The accompanying graph depicts the results of thermal conduction measurements made upon the solid glass materials of the present invention to permit a comparison with a prior art glass.

DESCRIPTION OF THE PREFERRED EMBODIMENTS

Preferred glasses, according to present invention, are shown in Table I below along with one previously identified prior art glass (Example 1) so that a comparison therebetween can be made. As is common in the glass arts, said glass compositions are reported in terms of oxides as calculated from the further listed batch starting material weights. Although there may be a minor difference between the glass composition as calculated in this conventional manner from batch constitutents and the actual glass composition obtained therefrom, both compositions will be essentially the same due to only slight volatilization of the alkali metal oxides during glass melting.

TABLE I

| | Examples | | | |
|---|---|---|---|---|
| | 1 | 2 | 3 | 4 |
| Batch Weight (#) | | | | |
| Sand | 150 | 150 | 150 | 150 |
| Litharge | 101 | 101 | 101 | 101 |
| Potassium Carbonate | 56 | 56 | 56 | 56 |
| Strontium Carbonate | 25 | 25 | 25 | 25 |
| Feldspar | 93 | 93 | 93 | 93 |
| Potassium Nitrate | 2.8 | 2.8 | 2.8 | 2.8 |
| Antimony Oxide | 2.6 | 2.6 | 2.6 | 2.6 |
| Sodium Nitrate | 2.4 | 2.4 | 2.4 | 2.4 |
| Boric Acid (Anhydrous) | 0.45 | 0.45 | 0.45 | 0.45 |
| Cerium Oxide (65% $CeO_2$) | 0 | 1.0 | 2.0 | 0 |
| Cerium Oxide (95% $CeO_2$) | 0 | 0 | 0 | 0.74 |
| Glass Composition (Wt %) | | | | |
| $SiO_2$ | 48.54 | 48.44 | 48.33 | 48.46 |
| PbO | 31.46 | 31.39 | 31.32 | 31.99 |

TABLE I-continued

|  | Examples | | | |
|---|---|---|---|---|
|  | 1 | 2 | 3 | 4 |
| $K_2O$ | 12.54 | 11.52 | 12.50 | 12.52 |
| SrO | 5.43 | 5.43 | 5.43 | 5.43 |
| $Sb_2O_3$ | 0.81 | 0.81 | 0.81 | 0.81 |
| $Al_2O_3$ | 0.56 | 0.56 | 0.56 | 0.56 |
| $Na_2O$ | 0.38 | 0.38 | 0.38 | 0.38 |
| $CeO_2$ | 0 | 0.22 | 0.43 | 0.20 |
| $B_2O_3$ | 0.14 | 0.14 | 0.14 | 0.14 |
| BaO | 0.06 | 0.06 | 0.06 | 0.06 |
| CaO | 0.04 | 0.04 | 0.04 | 0.04 |
| $Fe_2O_3$ | 0.019 | 0.019 | 0.019 | 0.019 |

The above glass batches were individually melted in a conventional day tank at a temperature of about 1450° C. with measurements being made of the relative seed counts during the refining period to detect the degree of any differences found therein. The results of said customary measurements are reported in Table II below to illustrate the degree of improvement attributable to the present refining system.

TABLE II

| Refining Period (Hrs.) | Examples (Seeds/Gram | | | |
|---|---|---|---|---|
|  | 1 | 2 | 3 | 4 |
| 9 | 2.00 | 1.16 | 2.13 | 0.47 |
| 10 | 0.165 | 0.102 | 0.047 | 0.051 |
| 11 | 0.169 | 0.053 | 0.065 | 0.118 |
| 12 | 0.074 | 0.008 | 0.010 | 0.046 |
| 13 | 0.024 | 0.010 | 0.005 | 0.001 |
| 14 | 0.006 | 0.014 | 0 | 0.005 |
| 15 | 0.010 | 0.019 | 0.013 | 0.004 |
| 16 | 0.026 | 0.019 | 0.011 | 0.004 |
| 17 | 0.009 | 0.009 | 0.025 | 0.006 |

It can be seen from the above Table II results that while either source of cerium oxide refining agent used in the above examples, proves effective in reducing the glass seed count during melting that a higher cerium oxide concentration in the refining agent produces a greater improvement.

The accompanying improvement in thermal shock resistance achieved with the presently modified refining system is illustrated in the accompanying graph. The graph depicts the results of the heat conduction measurement performed by impinging a gas oxygen flame against one side of a polished sample of the glass being tested. Two radiation pyrometers are positioned on the resulting hot spot with one pyrometer being aimed at the hot spot being impinged by the flame whereas the second pyrometer is focused on the opposite side of the glass sample. The peak temperatures recorded in this manner are reported on said graph to illustrate the temperature gradient across the glass thickness (3 mm.) during heating. It will be apparent from said results for the same glasses as disclosed in the previous examples that glasses containing cerium achieve significantly lower surface temperatures than the example 1 prior art glass. Said improved heat conduction found in the present glass is believed responsible for reduced thermal shock breakage when solid glass products are thermally reworked during vacuum tube assembly.

It will be apparent from the foregoing description that a novel refining system has been provided for an arsenic free lead silicate vacuum tube glass. Accordingly, the present glass provides an improved construction for a customary high voltage vacuum tube having a glass envelope wherein a greater freedom from discontinuities and thermal shock breakage reduces processing losses in the manufacture of this end product. It can be appreciated from said description, however, that various minor modifications can be made in the improved glass composition which still reside within the spirit and scope of the present invention such as further presence of incidental impurities, residual fluxes and still other oxides when added to modify the initial melt characteristics of the glass. It is intended, therefore, to limit the present invention only by the scope of the following claims.

What we claim as new and desire to secure by Letters Patent of the United States is:

1. A high voltage vacuum tube having a glass envelope, said glass consisting essentially of, in weight percent, 30–65% $SiO_2$, 20–40% PbO, 5–20% alkali metal oxides, 0–2% $Al_2O_3$, 0–10% alkaline earth metal oxides, 0–2% $Sb_2O_3$, and 0.1–0.5% $CeO_2$, with the aggregate content of $Sb_2O_3$ and $CeO_2$ being in the range of 0.4–2 wt. % wherein said glass envelope is made with the use of niter as a refining agent in an amount such that the weight ratio of niter to the aggregate weight of $Sb_2O_3$ and $CeO_2$ is in the range 0.5–4.

2. A vacuum tube as in claim 1 wherein the glass consists essentially of in weight percent 45–50% $SiO_2$, 25–35% PbO, 10–15% alkali metal oxides, 0.5–5.0% $Al_2O_3$, 5–10% alkaline earth metal oxides, 0.2–2% $Sb_2O_3$, and 0.2–0.4% $CeO_2$.

3. A vacuum tube as in claim 1 exhibiting the same optical transmission in the visible spectrum as when devoid of $CeO_2$ content.

4. A high voltage vacuum tube glass envelope having a composition consisting essentially of, in wt. %, 30–65% $SiO_2$, 20–40% PbO, 5–20% alkali metal oxides, 0–2% $Al_2O_3$, 0–10% alkaline earth metal oxides, 0–2% $Sb_2O_3$, and 0.1–0.5% $CeO_2$, with the aggregate content of $Sb_2O_3$ and $CeO_2$ being in the range of 0.4–2 wt. % wherein said glass envelope is made with the use of niter as a refining agent in an amount such that the weight ratio of niter to the aggregate weight of $Sb_2O_3$ and $CeO_2$ is in the range 0.5–4.

5. The vacuum tube glass envelope of claim 4 wherein the glass consists essentially of, in wt. % 45–50% $SiO_2$, 25–35% PbO, 10–15% alkali metal oxides, 0.5–5.0% $Al_2O_3$, 5–10% alkaline earth metal oxides, 0.2–2% $Sb_2O_3$, and 0.2–0.4% $CeO_2$.

6. The high voltage vacuum tube glass envelope of claim 5 exhibiting the same optical transmission in the visible spectrum as when devoid of $CeO_2$ content.

* * * * *